United States Patent
Uematsu et al.

(10) Patent No.: US 11,385,424 B2
(45) Date of Patent: Jul. 12, 2022

(54) OPTICAL FIBER SIDE INPUT/OUTPUT DEVICE AND DESIGN METHOD

(71) Applicant: Nippon Telegraph and Telephone Corporation, Tokyo (JP)

(72) Inventors: Takui Uematsu, Tokyo (JP); Hidenobu Hirota, Tokyo (JP); Hiroyuki Iida, Tokyo (JP); Tetsuya Manabe, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/266,071

(22) PCT Filed: Aug. 9, 2019

(86) PCT No.: PCT/JP2019/031562
§ 371 (c)(1),
(2) Date: Feb. 4, 2021

(87) PCT Pub. No.: WO2020/032234
PCT Pub. Date: Feb. 13, 2020

(65) Prior Publication Data
US 2021/0231892 A1    Jul. 29, 2021

(30) Foreign Application Priority Data
Aug. 10, 2018 (JP) .............. JP2018-151921

(51) Int. Cl.
*G02B 6/42* (2006.01)

(52) U.S. Cl.
CPC ................. *G02B 6/4289* (2013.01)

(58) Field of Classification Search
None
See application file for complete search history.

(56) References Cited

FOREIGN PATENT DOCUMENTS

| JP | 2015040916 |   | 3/2015 |
|----|------------|---|--------|
| JP | 2015-121460 A | * | 7/2015 |
| JP | 2018-84465 |   | 5/2018 |

OTHER PUBLICATIONS

Uematsu et al., "Optical signal extraction from optical fiber covered with a loose tube," IEICE, Technical Report, Jan. 2018, pp. 15-18, 9 pages (with English Translation).

* cited by examiner

*Primary Examiner* — Michael Stahl
(74) *Attorney, Agent, or Firm* — Fish & Richardson P.C.

(57) ABSTRACT

An optical fiber side input and output device in which light can be input and output from the side of the tube core cable without adjusting a spacing even in a case where the thickness of the protective tube differs, and a method of designing the optical fiber side input and output device is provided. An optical fiber side input and output device has a structure in which an angle of a central angle of an apex portion of a first jig having a convex portion is appropriately set, and a loss insertion is kept equal to or less than a prescribed value by using a relationship between a spacing at the angle and an insertion loss when light is input and output from the side of the tube core cable.

6 Claims, 8 Drawing Sheets

OPTICAL FIBER SIDE INPUT/OUTPUT DEVICE AND DESIGN METHOD

CROSS-REFERENCE TO RELATED APPLICATIONS

This application is a National Stage application under 35 U.S.C. § 371 of International Application No. PCT/JP2019/031562, having an International Filing Date of Aug. 9, 2019, which claims priority to Japanese Application Serial No. 2018-151921, filed on Aug. 10, 2018. The disclosure of the prior application is considered part of the disclosure of this application, and is incorporated in its entirety into this application.

TECHNICAL FIELD

The present disclosure relates to an optical fiber side input and output device in which light is input and output from the side of a bent optical fiber core cable, and a method of designing the device.

BACKGROUND ART

FIG. 1 is a diagram illustrating a structure of an optical fiber core cable with a tube (hereinafter referred to as a tube core cable) 100 in which an optical fiber core cable 1 is covered with a protective tube 2. The tube core cable 100 has a gap between a cover of the optical fiber core cable 1 and the protective tube 2. An optical fiber side input and output device in which an optical fiber is bent and light is input and output from a bent portion is considered for the tube core cable 100 as illustrated in FIG. 1 (for example, see Non Patent Literature 1).

FIG. 2 is a diagram illustrating a configuration of an optical fiber side input and output device 301. In the optical fiber side input and output device 301, the tube core cable 100 is sandwiched between a first concave jig 11 and a second convex jig 12 to form bending, and light is input and output from the bent portion. Non Patent Literature 1 describes that communication can be monitored without affecting the communication by setting a spacing S between the first concave jig 11 and the second convex jig 12 to an appropriate value.

A method of designing the optical fiber side input and output device 301 in the related art will be described. In the optical fiber side input and output device 301 of the related art, the spacing S between a bending apex portion of the first jig 11 and a bending apex portion of the second jig 12 is set such that S≈d+2t is satisfied (d is a diameter of the optical fiber core cable 1, and t is a thickness of the protective tube 2). That is, the optical fiber side input and output device 301 crushes the protective tube 2 to remove a gap between the optical fiber core cable 1 and the protective tube 2, and receives light leaking from the bent optical fiber core cable 1.

CITATION LIST

Non Patent Literature

Non Patent Literature 1: Uematsu et al., "Optical signal extraction from optical fiber covered with a loose tube," IEICE Technical Report, OFT 2017-59, January 2018.

SUMMARY OF THE INVENTION

Technical Problem

FIGS. 6, 7, and 9 of Non Patent Literature 1 illustrate that an insertion loss and output efficiency vary due to a variation in a thickness of a protective tube. Several types of tube core cables that greatly differ in a thickness of a protective tube are used for an off-site 8-branch splitter module in an optical access network. FIG. 3 is a graph illustrating dependence of an insertion loss and the spacing S when the optical fiber side input and output device 301 is set. It is necessary for the spacing S to be set for each tube core cable 100 depending on a thickness of the protective tube so that an insertion loss when the tube core cable 100 is sandwiched is equal to or less than a prescribed value (for example, equal to or less than 2 dB), as illustrated in FIG. 3. In the design method as in Non Patent Literature 1, when the thicknesses of the protective tubes greatly differ from one another, it is necessary for optical fiber side input and output devices to be individually adjusted depending on the thicknesses of the protective tubes in order to adjust the spacing S depending on the thicknesses of the protective tubes, and thus an improvement in workability is required.

To solve the above problems, an object of the present invention is to provide an optical fiber side input and output device in which light can be input and output from the side of a tube core cable without adjusting a spacing S even in a case where a thickness of a protective tube differs, and a method of designing the optical fiber side input and output device.

Means for Solving the Problem

To achieve the object, an optical fiber side input and output device according to the present invention has a structure in which an angle of a central angle of an apex portion of a first jig having a convex portion is appropriately set, and a loss insertion is kept equal to or less than a prescribed value by using a relationship between a spacing S at the angle and an insertion loss when light is input and output from the side of the tube core cable, even in a case where a thickness of a protective tube changes, and this eliminates the need for adjusting the spacing S.

Specifically, an optical fiber side input and output device according to the present invention includes:
a first jig including a concave portion bent in a longitudinal direction with respect to an optical fiber with a tube having a structure in which an optical fiber core cable is covered with a protective tube and a gap is present between the protective tube and the optical fiber core cable, and a light input and output unit configured to emit light to the optical fiber with a tube that is bent and receive light leaking from the optical fiber with a tube;
a second jig including a convex portion bent in the longitudinal direction with respect to the optical fiber with a tube and configured to sandwich the optical fiber with a tube between the convex portion and the concave portion of the first jig; and
a pressing unit configured to apply pressing force in a direction in which the concave portion of the first jig and the convex portion of the second jig approach each other such that a spacing S (S>0) between the concave portion of the first jig and the convex portion of the second jig is reduced to form bending in the optical fiber with a tube, wherein the convex portion of the second jig is an arc having a radius of curvature r and a central angle $\phi$ ($165° \leq \phi < 180°$).

When the central angle $\phi$ of the arc constituting the convex portion of the second jig is increased, a value of the insertion loss and a variation in the insertion loss with respect to the spacing S are decreased. In particular, when $\phi$ is set to be equal to or greater than 165°, the maximum value of insertion loss at all spacings S is kept less than the prescribed loss. That is, even in a case where the thickness of the protective tube changes, the insertion loss does not exceed the prescribed value. This eliminates the need for adjusting the spacing S. Thus, according to the present invention, an optical fiber side input and output device can be provided in which light can be input and output from the side of the tube core cable without adjusting the spacing S even in a case where the thickness of the protective tube differs.

Further, other structural parameters are preferably set as follows.

A radius of curvature r of the convex portion of the second jig is equal to or less than 2.8 mm, and
the concave portion of the first jig is an arc having a radius of curvature R ($2\text{ mm} \leq R \leq 3\text{ mm}$) and a central angle $\theta$ ($160° \leq \phi \leq 170°$).

Further, the spacing S is equal to or greater than 0.2 mm and equal to or less than 0.3 mm.

Further, the spacing S is set in the optical fiber side input and output device as follows. A design method of designing an optical fiber side input and output device configured to sandwich an optical fiber with a tube having a structure in which an optical fiber core cable is covered with a protective tube and a gap is present between the protective tube and the optical fiber core cable between a first jig including a concave portion bent in a longitudinal direction with respect to the optical fiber with a tube and a second jig including a convex portion bent in the longitudinal direction with respect to the optical fiber with a tube and configured to sandwich the optical fiber with a tube between the convex portion and the concave portion of the first jig, and apply pressing force to cause bending in a direction in which the concave portion of the first jig and the convex portion of the second jig approach each other such that a spacing S (S>0) between the concave portion of the first jig and the convex portion of the second jig is reduced, wherein light is emitted to the optical fiber with a tube that is bent and light leaking from the optical fiber with a tube is received by a light input and output unit included in the first jig, the design method including:

a first step of measuring first dependence of a first insertion loss and a spacing S for a central angle $\phi$ of the convex portion of the second jig in a case where the optical fiber side input and output device is installed for the optical fiber with a tube having the smallest thickness of the protective tube among a plurality of the optical fibers with a tube;
a second step of obtaining a spacing S1 from the first dependence measured in the first step, the spacing S1 being the spacing S at which the first insertion loss is maximized;
a third step of measuring second dependence of a second insertion loss and the spacing S in a case where the optical fiber side input and output device is installed for the optical fiber with a tube having the largest thickness of the protective tube among a plurality of the optical fibers with a tube;
a fourth step of obtaining a spacing S2 from the second dependence measured in the third step, the spacing S2 being the spacing S at which the second insertion loss is equal to or less than a prescribed loss of the insertion loss and that is equal to or less than the spacing S1; and a fifth step of setting a spacing between the concave portion of the first jig and the convex portion of the second jig to the spacing S2.

The design method further includes a sixth step of obtaining a spacing S3 from a range of the spacing S2 or less, the spacing S3 being the spacing S at which the output efficiency is equal to or greater than prescribed output efficiency, in a case where output efficiency with which the light input and output unit receives light leaking from the optical fiber with a tube having the smallest thickness of the protective tube among a plurality of the optical fibers with a tube is less than prescribed output efficiency; and a seventh step of setting a spacing between the concave portion of the first jig and the convex portion of the second jig to the spacing S3.

For the optical fiber with a tube having the smallest thickness of the protective tube among a plurality of the optical fibers with a tube, the light input and output unit is aligned to a position at which input and output efficiency is maximized.

Effects of the Invention

According to the present invention, an optical fiber side input and output device can be provided in which light can be input and output from the side of the tube core cable without adjusting a spacing S even in a case where the thickness of the protective tube differs, and a method of designing the optical fiber side input and output device can be also provided.

DESCRIPTION OF EMBODIMENTS

Hereinafter, embodiments of the present invention will be described with reference to the drawings. The embodiments described below are examples of the present invention, and the present invention is not limited to the following embodiments. In the present specification and the drawings, components having the identical reference signs are assumed to be the same components.

Figure 1:
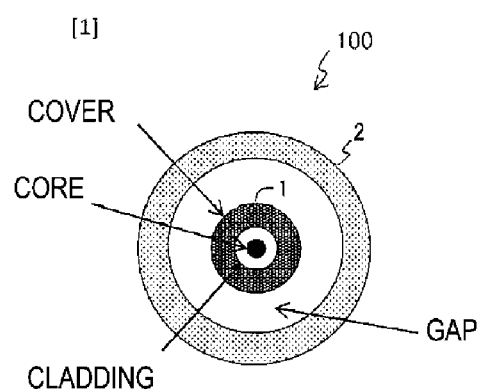
FIG. 1 is a cross-sectional view illustrating an optical fiber core cable with a tube.
Figure 2:
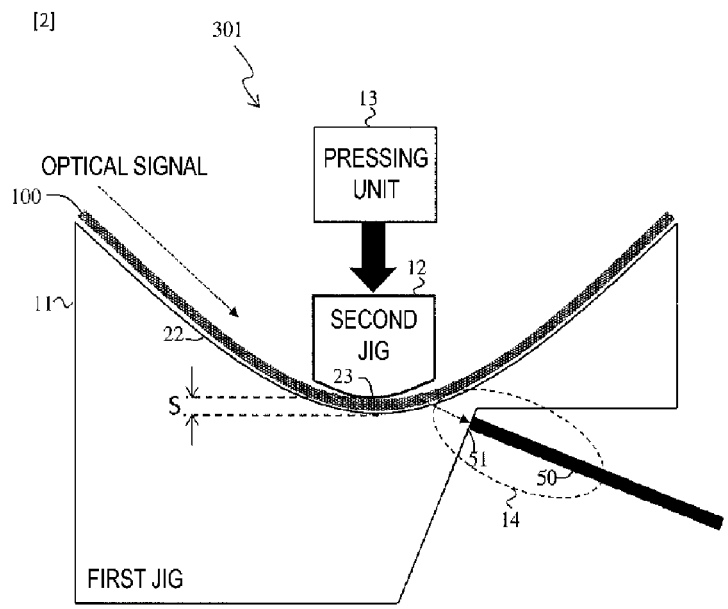
FIG. 2 is a diagram illustrating a configuration of an optical fiber side input and output device according to the present invention.
Figure 3:
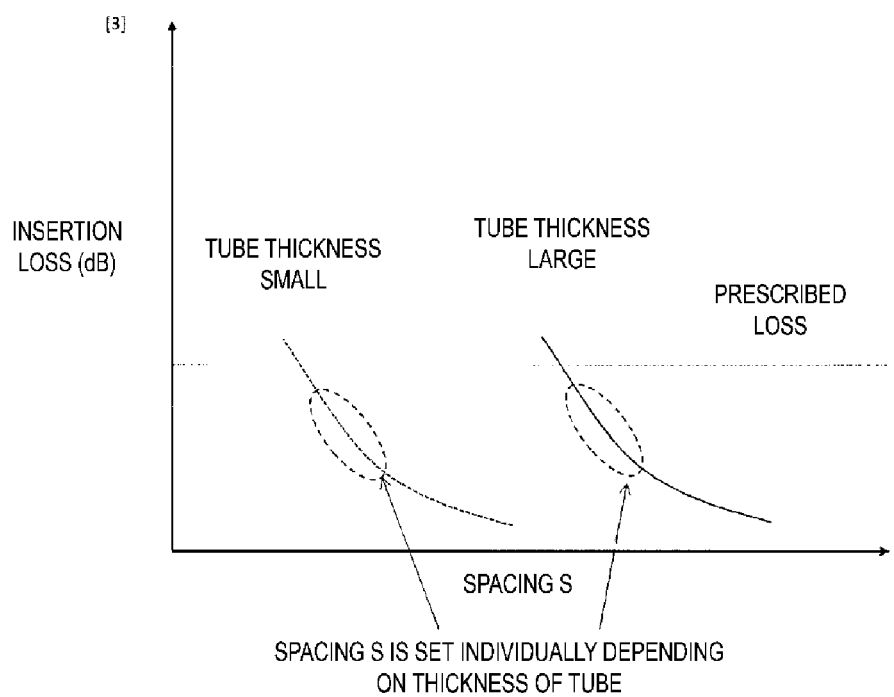
FIG. 3 is a diagram illustrating dependence of an insertion loss and the spacing S when the optical fiber side input and output device is set.
Figure 4:
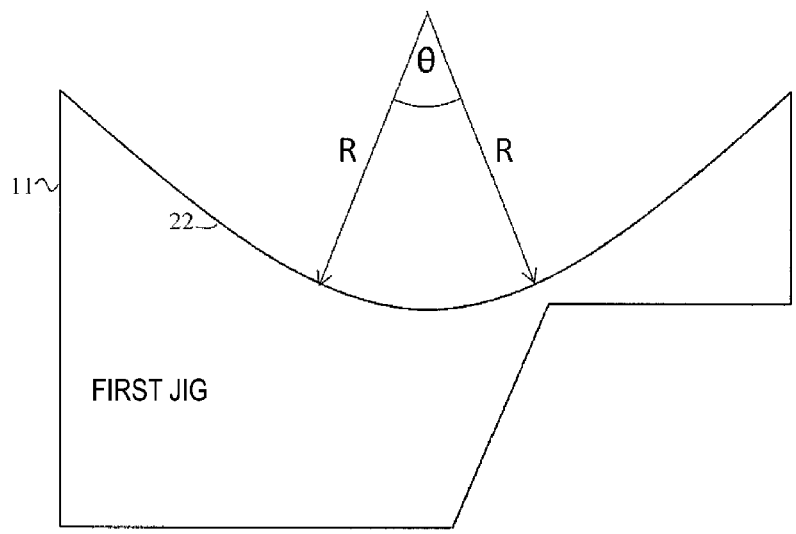
FIG. 4 is a diagram illustrating a first jig of the optical fiber side input and output device according to the present invention.
Figure 5:
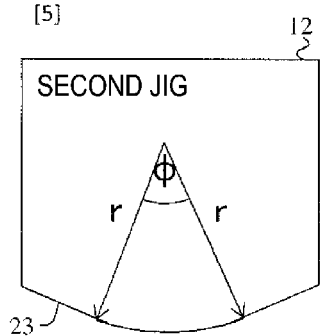
FIG. 5 is a diagram illustrating a second jig of the optical fiber side input and output device according to the present invention.

An optical fiber side input and output device according to the embodiment will be described with reference to FIG. 2. Further, FIGS. 4 and 5 are diagrams illustrating a structure of a first jig 11 and a second jig 12. An optical fiber side input and output device 301 includes:
a first jig 11 including a concave portion 22 bent in a longitudinal direction with respect to an optical fiber with a tube 100 having a structure in which an optical fiber core cable 1 is covered with a protective tube 2 and a gap is present between them, and a light input and output unit 14 configured to emit light to the optical fiber with a tube 100 that is bent and receive light leaking from the optical fiber with a tube 100;
a second jig 12 including a convex portion 23 bent in the longitudinal direction with respect to the optical fiber with a tube 100 and configured to sandwich the optical fiber with a tube 100 between the convex portion 23 and the concave portion 22 of the first jig 11; and a pressing unit 13 configured to apply pressing force in a direction in which the concave portion 22 of the first jig 11 and the convex portion 23 of the second jig 12 approach each other such that the spacing S (S>0) between the concave portion 22 of the first jig 11 and the convex portion 23 of the second jig 12 is reduced, to form bending in the optical fiber with a tube 100, wherein the convex portion 23 of the second jig 12 is an arc having a radius of curvature r and a central angle φ (165°≤φ<180°) (see FIG. 5).

Further, a method of designing the optical fiber side input and output device according to the embodiment will be described. The design method is a method of designing an optical fiber side input and output device configured to sandwich an optical fiber with a tube having a structure in which an optical fiber core cable is covered with a protective tube and a gap is present between the protective tube and the optical fiber core cable between a first jig including a concave portion bent in a longitudinal direction with respect to the optical fiber with a tube and a second jig including a convex portion bent in the longitudinal direction with respect to the optical fiber with a tube and configured to sandwich the optical fiber with a tube between the convex portion and the concave portion of the first jig, and apply pressing force to cause bending in a direction in which the concave portion of the first jig and the convex portion of the second jig approach each other such that a spacing S (S>0) between the concave portion of the first jig and the convex portion of the second jig is reduced, wherein light is emitted to the bent optical fiber with a tube and light leaking from the optical fiber with a tube is received by a light input and output unit included in the first jig.

In the design method, a first step, a second step, a third step, a fourth step, and a fifth step are performed as will be described next. In the first step, the first dependence of the first insertion loss on the spacing S is measured for each value of the central angle θ of the convex portion of the second jig when the optical fiber side input and output device is installed for the optical fiber with a tube having the smallest thickness of the protective tube among the optical fibers with a tube.

In the second step, the spacing S1 that is the spacing S at which the first insertion loss is maximized is obtained from the first dependence measured in the first step. In the third step, second dependence of the second insertion loss on the spacing S is measured when the optical fiber side input and output device is installed for the optical fiber with a tube having the largest thickness of the protective tube among the optical fibers with a tube is measured.

In the fourth step, the spacing S2 is obtained from the second dependence measured in the third step such that the following conditions are satisfied. Here, a condition was set such that a value of the second insertion loss is equal to or less than a prescribed loss of the insertion loss, and a value of the spacing S is equal to or less than the spacing S1.

In the fifth step, a spacing between a concave portion of the first jig and a convex portion of the second jig is set to the spacing S2.

Figure 6:
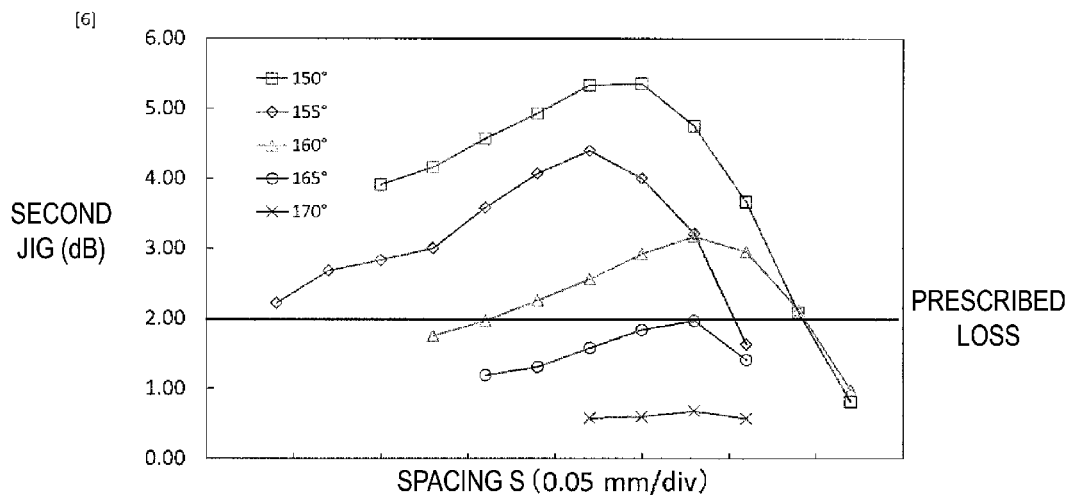
FIG. 6 is a diagram illustrating dependence of an insertion loss and a spacing S for each $\phi$ of the second jig of the optical fiber side input and output device according to the present invention.

FIG. 6 is a diagram illustrating dependence of an insertion loss for each φ of the second jig 12 and the spacing S acquired in the first step. φ ranges from 150 to 170°. R of the first jig 11 is 2.125 mm, θ is 170°, r of the second jig 12 is 1 mm, and a measurement wavelength is 1550 nm. A tube core cable having the maximum tube thickness was used as the tube core cable 100, and an R30 fiber was used as the optical fiber core cable 1 in the tube core cable. The R30 fiber is an optical fiber that can be bent to a radius of 30 mm (a bending loss is 0.1 dB or less (at a wavelength of 1550 nm) when the number of turns at a radius of 30 mm is 100). When the spacing S decreases, the insertion loss is maximized at a certain spacing and decreases at a smaller spacing S, as illustrated in FIG. 6. Thus, the maximum value of insertion loss can be controlled by setting θ appropriately. In the embodiment, the insertion loss can be set to be equal to or less than the prescribed value of 2 dB when θ is set to be equal to or greater than 165°.

Figure 7:
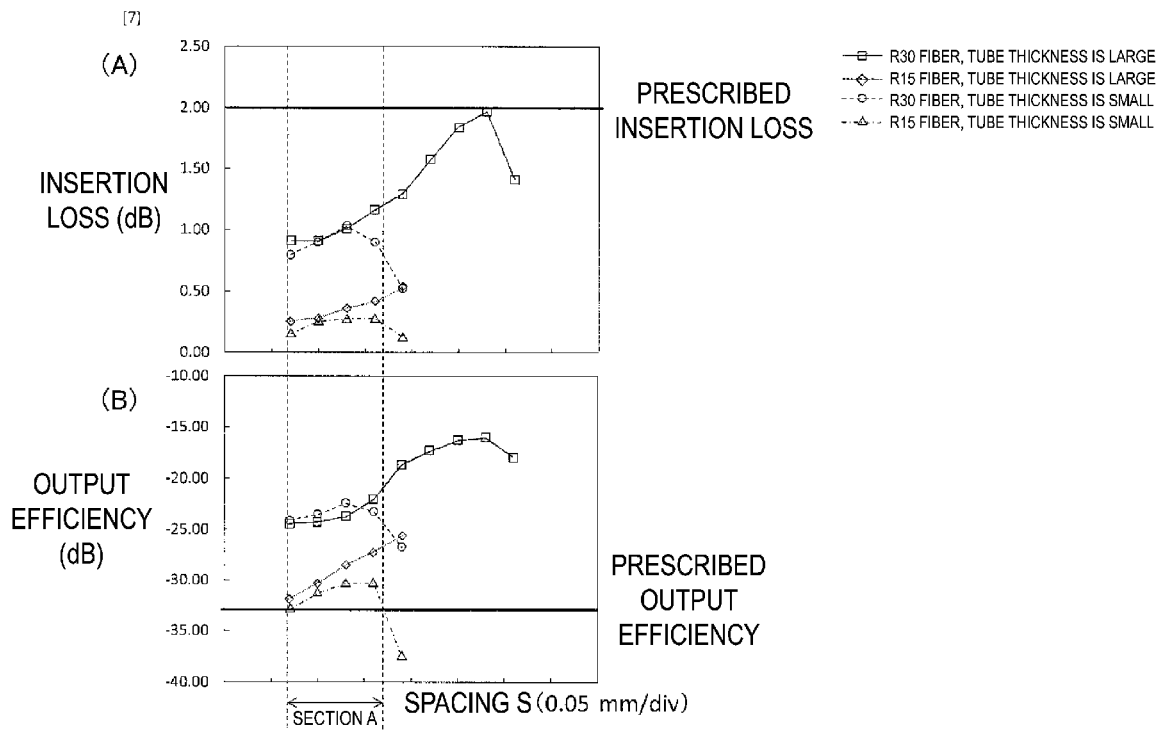
FIG. 7 is a diagram illustrating dependence of an insertion loss (FIG. 7(A)) and output efficiency (FIG. 7(B)) and the spacing S when $\phi$ of the optical fiber side input and output device is set to 165° according to the present invention.

FIG. 7 is a diagram illustrating dependence of the insertion loss (FIG. 7(A)) and the output efficiency (FIG. 7(B)) and the spacing S when φ is 165°. A measurement wavelength for an insertion loss is 1550 nm, and a measurement wavelength for an output efficiency is 1310 nm. A tube core cable having a maximum thickness and a tube core cable having a minimum thickness were used as the tube core cables 100, and an R30 fiber and an R15 fiber were used as the optical fiber core cables 1 in the tube core cable 100 (a bending loss is 0.03 dB or less (at a wavelength of 1550 nm) when the number of turns at a radius of 15 mm is 10).

It is difficult to monitor communication using the optical fiber side input and output device 301 in a case in which there is little light leaking from the tube core cable 100 even in a case where the insertion loss satisfies the prescribed value. Therefore, the spacing S needs to be set so that the output efficiency is equal to or greater than a prescribed value. Specifically, the design method further includes performing a sixth step and a seventh step to be described below.

In the sixth step, in a case where output efficiency with which the light input and output unit receives light leaking from the optical fiber with a tube having the smallest thickness of the protective tube among the optical fibers with a tube is less than prescribed output efficiency, a spacing S3, which is the spacing S at which the output efficiency is equal to or greater than the prescribed output efficiency, is obtained from a range of the spacing S2 or less.

In the seventh step, a value of the spacing between the concave portion of the first jig and the convex portion of the second jig is set to the spacing S3.

For example, in the case of the R15 fiber having a small tube thickness as illustrated in FIG. 7(B), the output efficiency may be less than the prescribed value depending on the spacing S. Therefore, the spacing S is set in a section A in which the insertion loss satisfies the prescribed value and the force efficiency exceeds the prescribed value. Setting such a spacing S allows the insertion loss to be set to be equal to or less than the prescribed value of 2 dB and the output efficiency to be set to be equal to or greater than a prescribed value of −33 dB for all of four types of tube core cables. In this measurement, the spacing S ranging approximately from 0.2 to 0.3 mm satisfied the conditions. This is a value less than the spacing S (0.325 to 0.33 mm) in the related art described in Non Patent Literature 1.

As described above, in a case where the spacing S of the optical fiber side input and output device 301 was set to a predetermined value (0.2 to 0.3 mm), both the insertion loss and the output efficiency were able to satisfy the prescribed value for all of tube core cables having different tube thicknesses. That is, in a case where φ is set to be equal to or greater than 165° and the spacing S is set to a range from 0.2 mm to 0.3 mm, it is not necessary for an operator to switch the spacing S for each type of tube core cable.

Note that when the design method is performed, the light input and output unit 14 is preferably aligned to a position at which input and output efficiency is maximized for the optical fiber with a tube 100 having the smallest thickness of the protective tube among the optical fibers with a tube.

EXAMPLE 1

Figure 8:
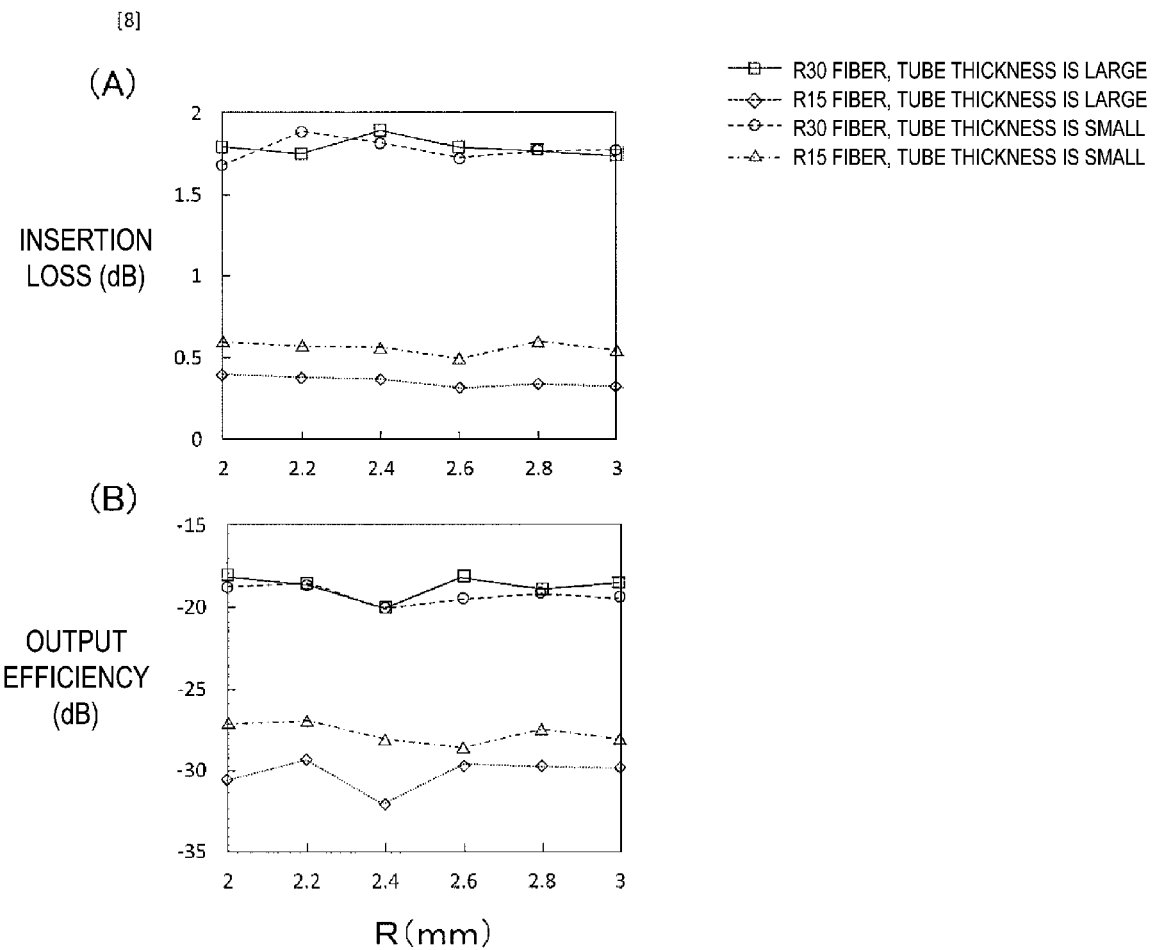
FIG. 8 is a diagram illustrating dependence of an insertion loss (FIG. 8(A)) and output efficiency (FIG. 8(B)) and R that is a radius of curvature of a concave jig when $\phi$ of the optical fiber side input and output device is set to 165° according to the present invention.

FIG. 8 is a diagram illustrating dependence of the insertion loss (FIG. 8(A)) and the output efficiency (FIG. 8(B)) and R that is a radius of curvature of the concave jig when φ is 165°. A measurement wavelength for an insertion loss is 1550 nm, and a measurement wavelength for an output efficiency is 1310 nm. A tube core cable having a maximum thickness and a tube core cable having a minimum thickness were used as the tube core cables, and an R30 fiber and an R15 fiber were used as the optical fiber core cables in the tube core cable. It can be seen from FIG. 8 that when R ranges from 2 mm to 3 mm, the insertion loss and the output efficiency are constant, the insertion loss is equal to or less than the prescribed value of 2 dB, and the output efficiency is equal to or greater than the prescribed value of −33 dB. Thus, R can be set to a range from 2 to 3 mm.

Further, it is necessary for r that is a radius of curvature of the convex jig to be a radius of curvature obtained by subtracting the spacing S from the radius of curvature R of the concave jig so that the tube core cable is sufficiently sandwiched. That is, it is necessary for r≤R-S to be satisfied.

As described above, since R ranges from 2 mm to 3 mm, and S ranges from 0.2 mm to 0.3 mm, r is 3−0.2=2.8 mm or less, preferably 2−0.2=1.8 mm or less. In the embodiment, r=1.0 mm is used.

EXAMPLE 2

Figure 9:
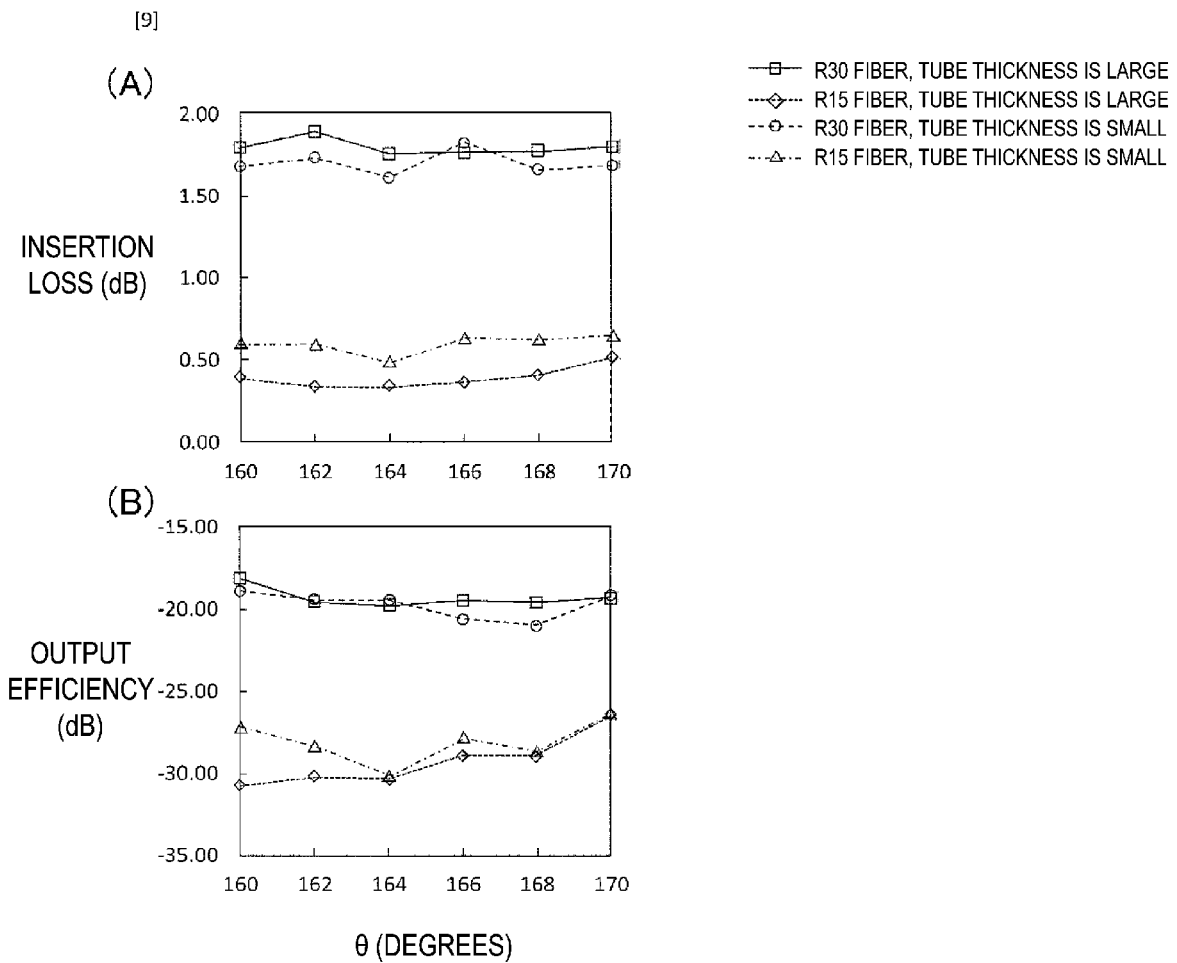
FIG. 9 is a diagram illustrating dependence of an insertion loss (FIG. 9(A)) and output efficiency (FIG. 9(B)) and a bending angle θ of the concave jig when φ of the optical fiber side input and output device is set to 165° according to the present invention.

FIG. 9 is a diagram illustrating dependence of the insertion loss (FIG. 9(A)) and the output efficiency (FIG. 9(B)) and a bending angle θ of the concave jig when φ is 165°. A measurement wavelength for an insertion loss is 1550 nm, and a measurement wavelength for an output efficiency is 1310 nm. A tube core cable having a maximum thickness and a tube core cable having a minimum thickness were used as the tube core cables, and an R30 fiber and an R15 fiber were used as the optical fiber core cables in the tube core cable. It can be seen from FIG. 9 that the insertion loss is equal to or less than the prescribed value of 2 dB, and the output efficiency is equal to or greater than the prescribed value of −33 dB at 0 ranging from 160° to 170°. Thus, θ can be set to a range from 160° to 170°.

EXAMPLE 3

Figure 10:
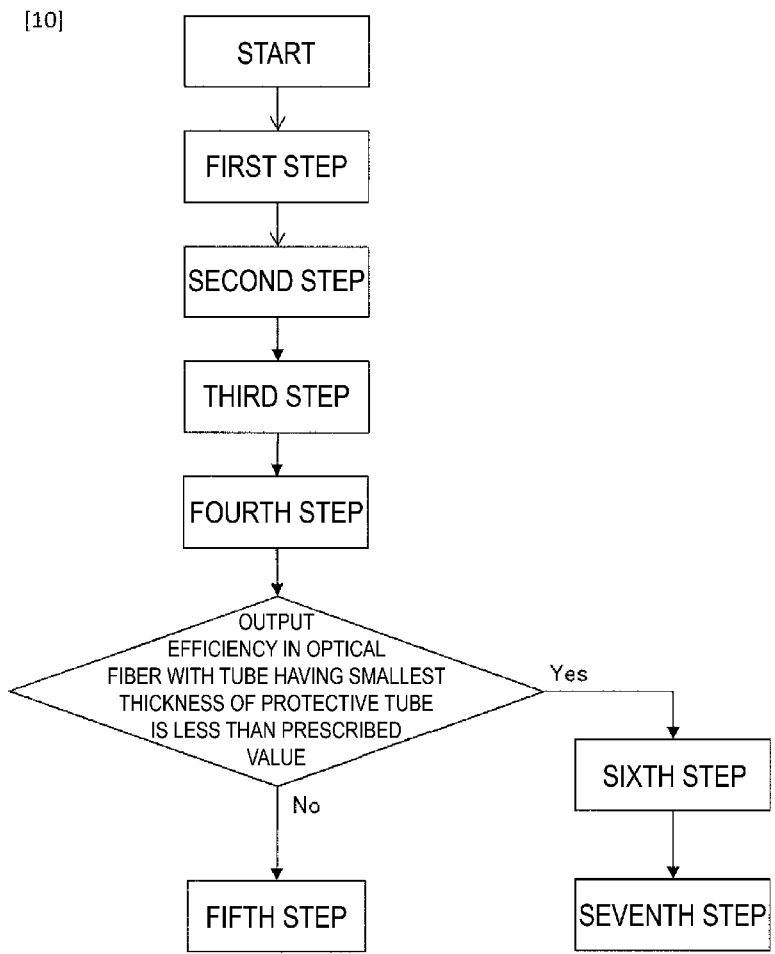
FIG. 10 is a flowchart illustrating a design method according to the present invention.

FIG. 10 is a diagram illustrating a method of designing the optical fiber side input and output device 301 according to the embodiment.

Figure 11:
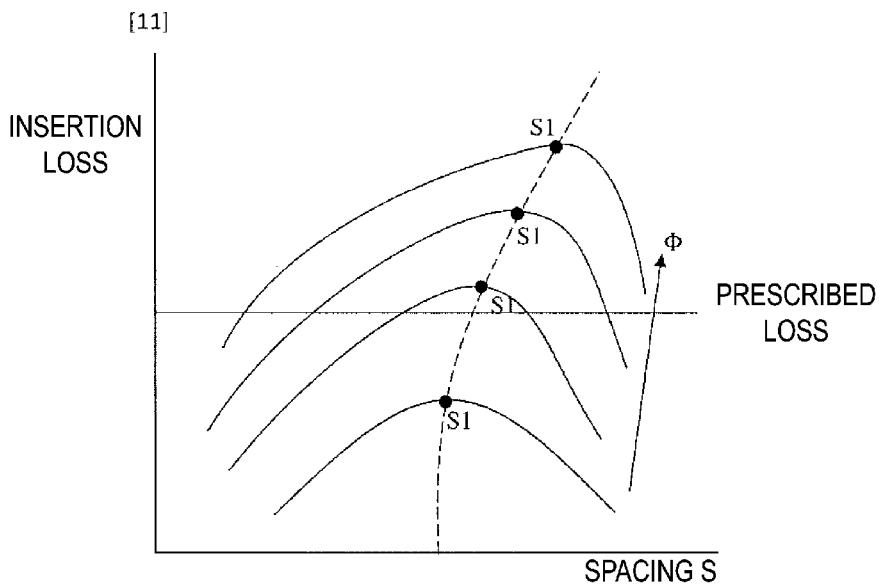
FIG. 11 is a diagram illustrating a procedure for acquiring S1 in the spacing S between a concave portion of the first jig and a convex portion of the second jig of the optical fiber side input and output device according to the present invention.
Figure 12:
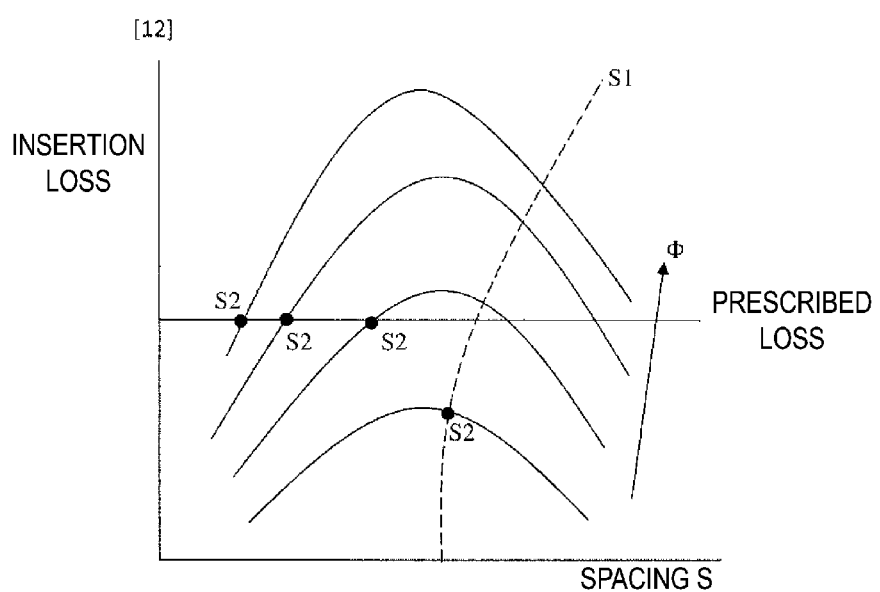
FIG. 12 is a diagram illustrating a procedure for acquiring S2 in the spacing S between the concave portion of the first jig and the convex portion of the second jig of the optical fiber side input and output device according to the present invention.

A first step of measuring first dependence of a first insertion loss and a spacing S for a central angle φ of the convex portion of the second jig when the optical fiber side input and output device is installed for the optical fiber with a tube having the smallest thickness of the protective tube among the optical fibers with a tube;

a second step of obtaining a spacing S1 from the first dependence measured in the first step, the spacing S1 being the spacing S at which the first insertion loss is maximized (see FIG. 11);

a third step of measuring second dependence of the second insertion loss and the spacing when the optical fiber side input and output device is installed for the optical fiber with a tube having the largest thickness of the protective tube among the optical fibers with a tube;

a fourth step of obtaining a spacing S2 from the second dependence measured in the third step, the spacing S2 being the spacing S at which the second insertion loss is equal to or less than a prescribed loss of the insertion loss and that is equal to and less than the spacing S1 (see FIG. 12); and a fifth step of setting the spacing between the concave portion of the first jig and the convex portion of the second jig to the spacing S2 are performed.

Note that after the fourth step ends, a sixth step of obtaining a spacing S3, which is the spacing S at which the output efficiency is equal to or greater than the prescribed output efficiency, from a range of the spacing S2 or less and the seventh step of setting a spacing between the concave portion of the first jig and the convex portion of the second jig to the spacing S3 are performed without performing the fifth step when output efficiency with which the light input and output unit receives light leaking from the optical fiber with a tube having the smallest thickness of the protective tube among the optical fibers with a tube is less than prescribed output efficiency.

Effects of the Invention

In the present invention, since the spacing S is set to a unique value regardless of the thickness of the tube, φ of the second jig is appropriately set, and S is less than the spacing S set for a tube core cable having a small tube thickness in the related art.

REFERENCE SIGNS LIST

1 Optical fiber core cable
2 Protective tube
11 First jig
12 Second jig
13 Pressing unit
14 Light input and output unit
50 Probe optical fiber
51 Holding portion
22 Concave portion
23 Convex portion
100 Optical fiber core cable with tube, tube core cable
301 Optical fiber side input and output device

The invention claimed is:

1. An optical fiber side input and output device comprising:
   a first jig including:
      a concave portion bent in a longitudinal direction with respect to an optical fiber with a tube having a structure in which an optical fiber core cable is covered with a protective tube and a gap is present between the protective tube and the optical fiber core cable; and
      a light input and output unit configured to emit light to the optical fiber with a tube that is bent and receive light leaking from the optical fiber with the tube;
   a second jig including a convex portion bent in the longitudinal direction with respect to the optical fiber with the tube and configured to sandwich the optical fiber with the tube between the convex portion and the concave portion of the first jig; and
   a pressing unit configured to apply pressing force in a direction in which the concave portion of the first jig and the convex portion of the second jig approach each other to form a bend in the optical fiber with the tube such that a spacing S that is greater than zero between the concave portion of the first jig and the convex portion of the second jig is reduced,
   wherein the convex portion of the second jig is an arc having a radius of curvature r and a central angle φ, wherein the central angle φ is greater than or equal to 165° and wherein the central angle is less than 180°.

2. The optical fiber side input and output device according to claim 1, wherein the radius of curvature r of the convex portion of the second jig is equal to or less than 2.8 mm, and wherein the concave portion of the first jig comprises an arc including a radius of curvature R that is greater than or equal to 2 mm and less than or equal to 3 mm and a central angle φ that is greater than or equal to 160° and less than or equal to 170°.

3. The optical fiber side input and output device according to claim 1, wherein the spacing S is equal to or greater than 0.2 mm and equal to or less than 0.3 mm.

4. A design method for designing an optical fiber side input and output device configured to:
   sandwich an optical fiber with a tube in which an optical fiber core cable is covered with a protective tube and a gap is present between the protective tube and the optical fiber core cable between a first jig including a concave portion bent in a longitudinal direction with respect to the optical fiber with the tube and a second jig including a convex portion bent in the longitudinal direction with respect to the optical fiber with the tube; and configured to:
   sandwich the optical fiber with the tube between the convex portion and the concave portion of the first jig, and apply pressing force to form a bend in a direction in which the concave portion of the first jig and the convex portion of the second jig approach each other such that a spacing S that is greater than zero between the concave portion of the first jig and the convex portion of the second jig is reduced, wherein light is emitted to the optical fiber with the tube that is bent and light leaking from the optical fiber with the tube is received by a light input and output unit included in the first jig,
the design method comprising:
   measuring a first dependence of a first insertion loss and the spacing S for a central angle φ of the convex portion of the second jig in a case where the optical fiber side input and output device is installed for the optical fiber with the tube comprising the smallest thickness of the protective tube among a plurality of optical fibers with the tube;
   obtaining a spacing S1 from the measured first dependence, the spacing S1 being the spacing S at which the first insertion loss is maximized;
   measuring a second dependence of a second insertion loss and the spacing S in which the optical fiber side input and output device is installed for the optical fiber with tube having the largest thickness of the protective tube among the plurality of optical fibers with the tube;
   obtaining a spacing S2 from the measured second dependence, the spacing S2 being the spacing S at which the second insertion loss is equal to or less than a prescribed loss and that is equal to or less than the spacing S1; and
   setting a spacing between the concave portion of the first jig and the convex portion of the second jig to the spacing S2.

5. The design method according to claim 4, further comprising:
   obtaining a spacing S3 from a range that is between the spacing S2 or less, the spacing S3 comprising the spacing S at which an output efficiency is equal to or greater than prescribed output efficiency, in a case in which output efficiency with which the light input and output unit included in the first jig receives light leaking from the optical fiber with the tube having the smallest thickness of the protective tube among the plurality of the optical fibers with the tube is less than prescribed output efficiency; and
   setting the spacing between the concave portion of the first jig and the convex portion of the second jig to the spacing S3.

6. The design method according to claim 4,
   wherein the light input and output unit included in the first jig is aligned to a position at which input and output efficiency is maximized for the optical fiber with the tube comprising the smallest thickness of the protective tube among the plurality of optical fibers with the tube.

* * * * *